United States Patent [19]
Murphy

[11] Patent Number: 5,855,377
[45] Date of Patent: Jan. 5, 1999

[54] DEAD LENGTH COLLECT CHUCK ASSEMBLY

[76] Inventor: William G. Murphy, 1141 E. Olympic Dr., Corona, Calif. 91719

[21] Appl. No.: 748,429

[22] Filed: Nov. 13, 1996

[51] Int. Cl.$^6$ .................................................. B23B 31/12
[52] U.S. Cl. .............................................. 279/50; 279/57
[58] Field of Search ................................ 279/50, 54, 55, 279/57, 146; 409/233

[56] References Cited

U.S. PATENT DOCUMENTS

| | | | |
|---|---|---|---|
| 628,730 | 7/1899 | Whitney et al. | 279/50 |
| 2,415,482 | 2/1947 | Greenough | 279/50 |
| 2,466,651 | 4/1949 | Zagar | 279/50 |
| 3,042,418 | 7/1962 | Sorsa et al. | 279/50 |
| 4,049,282 | 9/1977 | Yearsley | 279/50 |
| 4,121,848 | 10/1978 | Morawski | 279/60 |
| 4,171,820 | 10/1979 | Klancnik | 279/50 |
| 4,690,415 | 9/1987 | Holdridge | 279/4 |
| 5,160,150 | 11/1992 | Schmidt | 279/54 |
| 5,480,164 | 1/1996 | Murphy | 279/50 |
| 5,524,909 | 6/1996 | Wyatt | 279/50 |
| 5,549,308 | 8/1996 | Bennett | 279/50 |

FOREIGN PATENT DOCUMENTS 421184  11/1925  Germany .................................. 279/50

*Primary Examiner*—Steven C. Bishop
*Attorney, Agent, or Firm*—Loeb & Loeb LLP

[57] ABSTRACT

A collet chuck assembly includes a chuck body carrying a collet retaining ring for receiving the threaded rear end of a standard collet. The collet retaining ring is secured to the chuck body and held against both axial and radial movement relative to the chuck body by a plurality of radially extending fasteners having inner, tapered portions received by correspondingly tapered holes in the retaining ring. A longitudinally or axially displaceable closing sleeve compresses the collet jaws when the sleeve is moved inone axial direction and releases the jaws when moved in the other axial direction. Axial displacement of the closing sleeve is effected by a collet actuator including a plurality of longitudinal fingers extending through openings in the collet retaining ring and having end portions configured to interlock with a correspondingly configured mating portion of the collet closing sleeve. In a preferred embodiment the fingers and mating portion of the closing sleeve include releasable interlocking arcuate flanges and grooves.

8 Claims, 3 Drawing Sheets

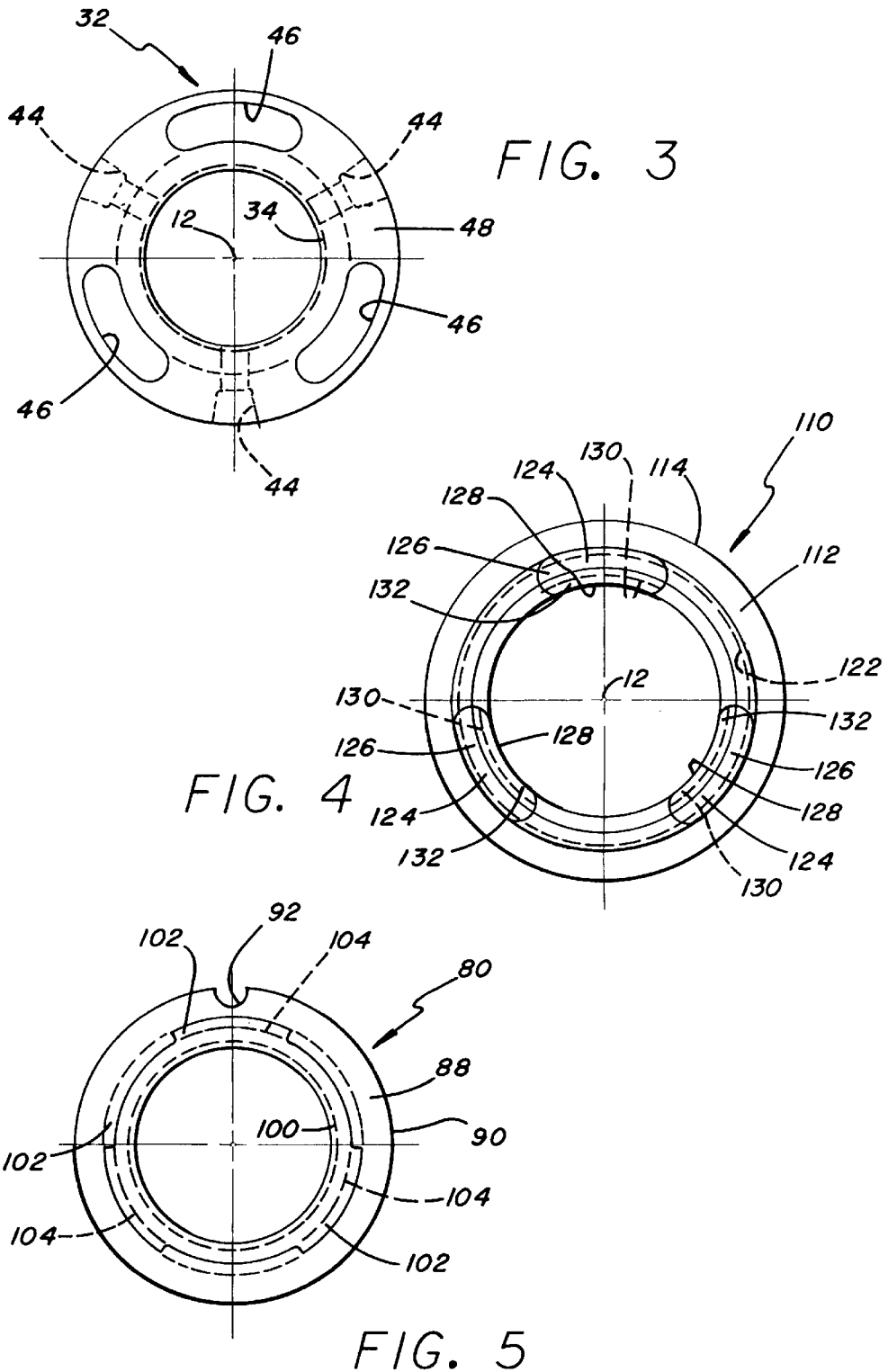

DEAD LENGTH COLLET CHUCK ASSEMBLY

FIELD OF THE INVENTION

The present invention relates generally to collet chuck assemblies for holding a work piece and more particularly to dead length collet chuck assemblies which hold the work piece against displacement during the collet closing and opening sequences.

BACKGROUND OF THE INVENTION

Dead length collet chuck assemblies for holding a collet against longitudinal or axial displacement which would cause errors in the machining operation are well known. Examples of such collet chuck assemblies are disclosed in U.S. Pat. Nos. 628,730; 2,415,482; 4,690,415; and 5,480,164. U.S. Pat. No. 5,480,164, issued Jan. 2, 1996 to the present inventor and incorporated herein by reference, discloses a dead length collet chuck assembly in which a standard collet is threadedly received by a collet retaining ring secured to an interior surface of a chuck body. A longitudinally displaceable camming or closing sleeve surrounding the collet and having a tapered, internal camming surface operatively associated with a conical, exterior surface on the split forward end portion of the collet, compresses and releases the jaws of the collet in a well-known fashion. The longitudinally displaceable closing sleeve is connected to a longitudinally displaceable actuator by means of a series of longitudinal bolts which pass through oversized holes in the collet retaining ring. The bolts are threadedly secured to both the actuator and closing sleeve so that longitudinal displacement of the actuator in one direction or the other causes a substantially corresponding displacement of the closing sleeve.

Although the collet chuck assembly of U.S. Pat. No. 5,480,164 is an improvement over earlier collet chuck holders, it has been found that the cyclical tensile and compressive loads applied to the bolts interconnecting the collet closing sleeve and the collet sleeve actuator during the collet closing and opening sequences on occasion cause fatigue failure of the bolts.

Accordingly, it is an overall object of the present invention to provide a dead length collet chuck assembly having a collet actuator/closing sleeve interconnection that is not subject to fatigue failure.

SUMMARY OF THE INVENTION

In accordance with one embodiment of the present invention, there is provided a dead length collet chuck assembly for compressing and permitting the release of the jaws of a standard collet comprising a threaded rear end portion and a compressible, flared, split forward end portion. The assembly has a longitudinal, central axis and includes a chuck body having a forward end portion defining a first bore coaxial of the central axis, and a rear end portion having a second bore coaxial of the central axial. The chuck body carries means, preferably in the form of a collet retaining ring, for receiving the threaded rear end portion of the collet and for restraining the collet against at least axially movement relative to the chuck body. The collet retaining ring is preferably held in place within the chuck body by a plurality of radially extending fasteners each having a threaded portion received by the chuck body and further including a tapered portion received by a correspondingly tapered hole in the collet retainer ring. The retainer ring is thereby fixedly secured against both axial and radial movement relative to the chuck body. A collet closing sleeve is slidably disposed within the first bore of the chuck body and is axially displaceable relative thereto. The closing sleeve has forward and rear end portions, an interior surface and an exterior surface, the interior surface of the sleeve at the forward end portion thereof being flared to engage and mate with the flared exterior surface of the forward end portion of the collet. Axial displacement of the closing sleeve relative to the chuck body in one direction compresses the jaws of the collet and axial displacement of the closing sleeve in the other direction releases the jaws. A collet actuator, slidably disposed within the second bore of the chuck body, is adapted to be coupled to an actuator driver for axially displacing the actuator relative to the chuck body. The collet actuator includes a plurality of forwardly extending fingers having forward ends, the forward ends of the actuator fingers and the rear portion of the closing sleeve being configured to interlock so that axial displacement of the actuator causes a substantially corresponding axial displacement of the closing sleeve so as to compress or release the jaws of the collet. Preferably, the collet actuator and fingers are made as an integral unitary structure.

BRIEF DESCRIPTION OF THE DRAWINGS

Further objects, features and advantages of the invention will become apparent from the "Detailed Description of the Preferred Embodiment", below, when read in conjunction with the accompanying drawings, in which:

FIG. 3 is a front elevation view of the collet retainer ring, as seen along the line 3—3 in FIG. 2;

FIG. 4 is a front elevation view of the collet closing sleeve actuator, as seen along the line 4—4 in FIG. 2; and FIG. 5 is a rear elevaton view of the collet closing sleeve as seen along the line 5—5 in FIG. 2.

DETAILED DESCRIPTION OF THE PREFERRED EMBODIMENT

Figure 1:
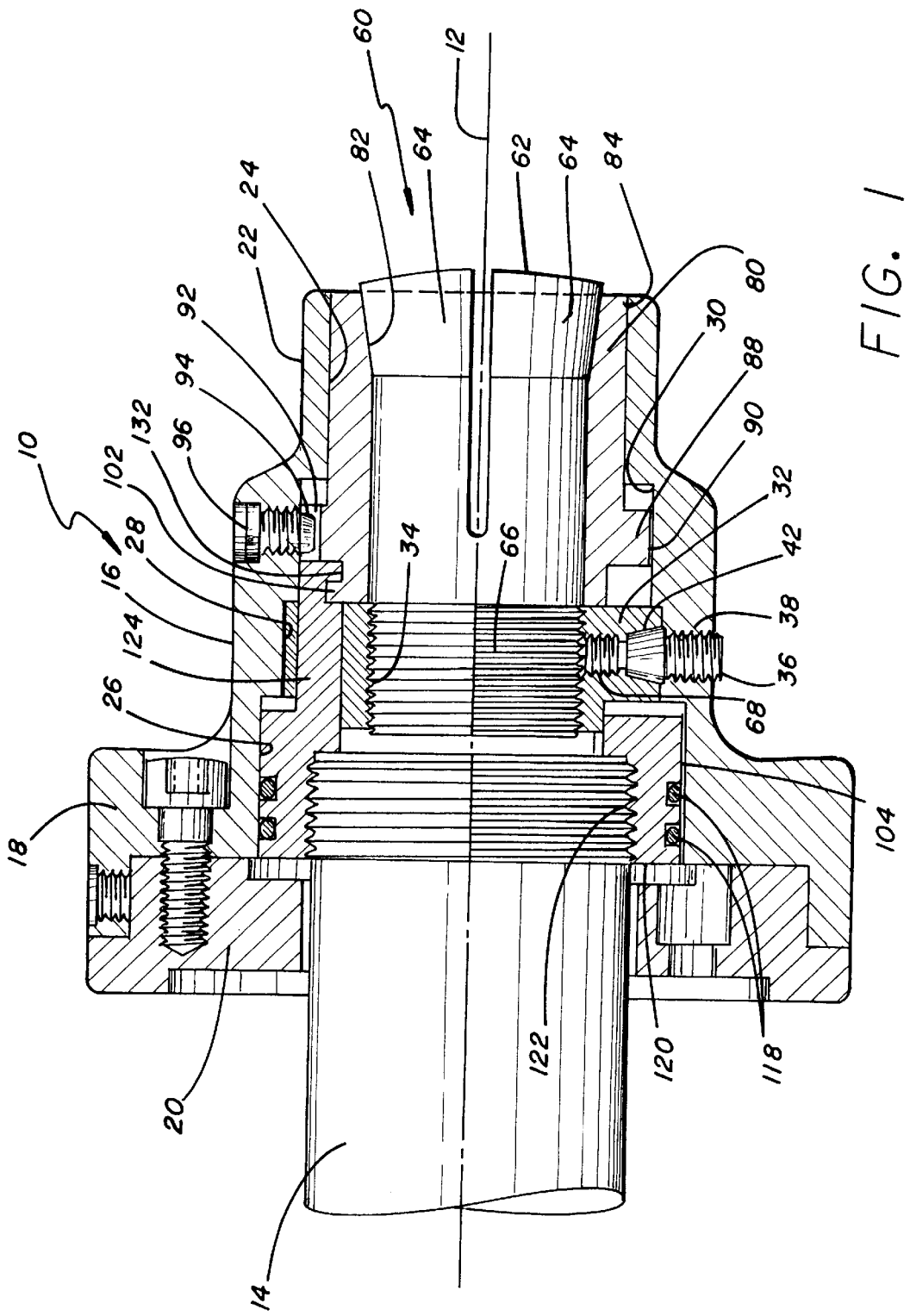
FIG. 1 is an axial cross section of a collet chuck assembly in accordance with the present invention.
Figure 2:
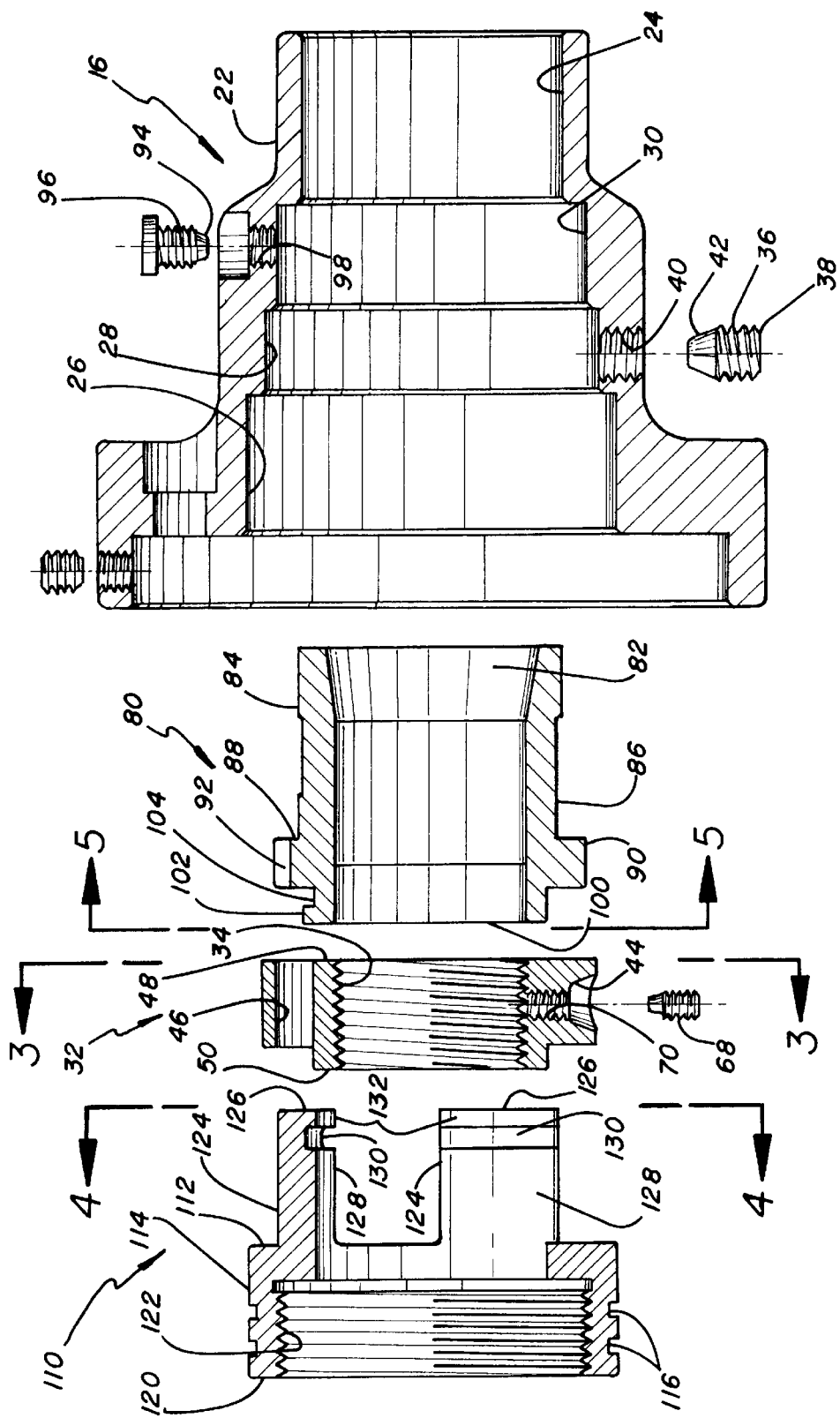
FIG. 2 is an axial exploded cross section of the assembly of FIG. 1 showing the main components of the assembly, including the chuck body, the collet closing sleeve, the collet retainer ring and the collet closing sleeve actuator.

The following describes a preferred embodiment of the invention representing the best mode contemplated for practicing the invention. This description is not to be taken in a limiting sense but is made merely for the purpose of describing the general principles of the invention whose scope is defined by the appended claims.

Referring now to the drawings there is shown a collet chuck assembly 10 having a longitudinal central, rotational axis 12. The assembly 10 is adapted to be attached to the rotatable spindle (not shown) on the head stock of a lathe or other machine tool. The rotatable spindle of the machine tool includes a push tube 14 that is axially displaceable relative to the machine tool spindle.

The collet chuck assembly 10 includes a chuck body 16 having a rear portion 18 bolted to a mounting plate 20 which in turn is adapted to be secured, by bolts or otherwise, to the machine tool spindle. The chuck body 16 has a forward portion 22 defining a first bore 24 coaxial of the longitudinal rotational axis 12. The chuck body 16 further includes in its rear portion 18 a second bore 26, concentric with and larger than the first bore 24. In the specific embodiment illustrated, disposed between the first and second bores 24 and 26 are intermediate coaxial bores 28 and 30, the diameters of the various bores 24, 26, 28 and 30 being such that they become progressively larger from the forward to the rear portions of the chuck body 16. It will become evident as the description proceeds, however, that the intermediate bores 28 and 30 may be omitted, the chuck body 16 then being provided only with adjoining first and second bores 24 and 26.

Disposed within the intermediate bore 28 is a collet retaining ring 32 coaxial with the longitudinal central axis 12 and having internal threads 34. The retainer ring 32 is secured to the chuck body 16 and fixed both axially and radially relative thereto by a plurality, for example, three, radially extending screws 36 each having a threaded outer end 38 received by a threaded hole 40 in the chuck body 16, and a tapered, inner end 42 adapted to be received by correspondingly tapered radially oriented hole 44 in the retainer ring 32. The retainer ring 32 further includes a plurality of arcuate slots 46 extending longitudinally between the front and rear surfaces 48 and 50 of the retainer ring 32. Viewed along the longitudinal central axis 12, the arcuate slots 46 (of which there are three in this embodiment) are equiangularly spaced about thea central axis 12, with each slot, in accordance with one specific embodiment illustrated here, subtending an angle of about 56° (FIG. 3).

The collet chuck assembly 10 is adapted to retain in the forward end portion 22 thereof a standard spring collet 60 having a split, flared front end 62 defining a plurality of jaws 64 for holding a workpiece and a rear, threaded end 66. The internal threads 34 on the collet retainer ring 32 receive the rear threaded end 66 of the spring collet 60 so as to hold the collet in fixed positional relationship relative to the chuck body 16. The collet 60 is further secured to the retainer ring by set screws 68 threadedly received by holes 70 in the collet retaining ring 32 centered on the tapered holes 44

A collet camming or closing sleeve 80 coaxial of the central axis 12 and disposed about the collet 60 is axially displaceable relative to the fixed collet within the bores 24 and 30 to compress and release the jaws 64 of the collet 60. The closing sleeve 80 includes a forward end portion 82 internally flared to match the taper of the flared front end 62 of the collet. As is well known, the flared end portion 82 of the sleeve engages the flared front end 62 of the collet to compress the jaws 64 when the closing sleeve 80 is axially displaced toward the forward end of the collet. Axial displacement of the sleeve 80 rearwardly releases the jaws 64 allowing them to expand and release their grip on the workpiece.

The forward end portion 82 of the collet closing sleeve 80 has an outer cylindrical surface 84 that is axially slideable within the first bore 24 of the chuck body 16. The sleeve 80 further has a rear end portion 86 including an outwardly extending guide flange 88 having an outer cylindrical surface 90 in axially slideable engagement with the wall of the intermediate bore 30. A longitudinally extending slot 92 in the outer surface of the guide flange 88 receives the inner end 94 of a radially disposed screw 96 threadedly received by a hole 98 in the chuck body 16. In this fashion, the closing sleeve 80 is freely moveable in an axial direction but is restrained by the screw 96 against rotation relative to the chuck body 16. It will be evident that more than one longitudinal slot 92, each cooperating with a screw 96 in the chuck body as described above, may be provided for this purpose.

The closing sleeve 80 has a rear extremity 100 provided with a plurality of spaced apart flange segments 102 rearward of the guide flange 88 and spaced apart therefrom to define a circumferential groove 104 between each arcuate flange segment 102 and the guide flange 88. As best seen in FIG. 5, and by way of example only, the preferred embodiment includes three equiangularly spaced, identical flange segments 102 each of which (again by way of example and not limitation) subtends an angle of about 56°, adjacent flange segments being thereby separated by about 64°.

The collet closing sleeve 80 is axially reciprocated by means of a generally cylindrical collet actuator 110 having a front, radially extending surface 112 and a cylindrical outer surface 114. The cylindrical outer surface 114 of the collet actuator 110 is slideably mounted within the second bore 26 of the chuck body 16 and may include longitudinally spaced annular grooves 116 for receiving sealing O-rings 118. The collet actuator 110 has a rear, radial surface 120 and extending forwardly from that surface is a threaded bore 112 centered on the longitudinal axis 12. The threaded bore 122 is adapted to receive the threaded forward extremity of the push tube 14. It will be evident that a threaded adapter (not shown) coupling the threaded bore 122 of the collet actuator 110 and the threaded end of the push tube 14 may be required depending on the size and/or threads of the draw tube of a particular machine tool.

Projecting forwardly from the front surface 112 of the collet actuator 110 are a plurality of equiangularly spaced, arcuate fingers 124 each having a front extremity 126, an interior surface 128 and a circumferentially oriented groove 130 formed in the interior surface 128 adjacent the front extremity 126. The portion of the fingers 124 between the groove 130 and the front extremity 126 comprises a flange 132. In the example illustrated here, three fingers 124 are provided each, as best seen in FIG. 4, subtending an angle of about 56°, that is, an angle approximately equal to that subtended by each flange segment 102 on the rear of the closing sleeve 80. Preferably, the collet actuator 110 and fingers 124 are formed as an integral, unitary structure, for example, by machining the actuator element from a single piece of stock.

The present invention provides for a strong, fatigue failure-resistant connection between the collet actuator 110 and collet closing sleeve 80. As seen in FIG. 1, the fingers 124 on the collet actuator 110 are configured to interlock with the flange segments 102 on the closing sleeve 80 in a manner resembling a tongue and groove joint, with the interior groove 130 adjacent the forward extremity 126 of each finger 124 receiving a corresponding flange segment 102 on the rear of the sleeve 80 and the flange 132 on each finger being received in the groove 104 between the corresponding flange segment 102 and the guide flange 88 on the sleeve 80. This interlocking yet releasable connection features large contacting surface areas which tend to distribute the cyclical loads imposed by the push tube. Stresses on the collet actuator/collet sleeve connection are thereby reduced preventing failure of the connection as tends to be the case with screws coupling the actuator and sleeve in existing dead length collet chuck assembly. The collet actuator and collet closing sleeve are coupled by inserting the fingers through corresponding slots in the fixed collet retainer ring and advancing the forward ends of the fingers into the spaces between adjacent flange segments on the rear of the sleeve. When the front extremities of the fingers engage the guide flange on the sleeve the collet actuator may then be rotated relative to the sleeve so that the flanges on the fingers and sleeve enter the associated groove. Rotation of the actuator relative to the sleeve is continued until the flanges on the fingers and sleeve coincide. The retainer ring is then positioned and locked in place within the chuck body by means of the tapered screws.

In summary, the integral, unitary construction of the actuator and finger elements, together with the large size of the fingers and the relatively large contacting surface areas of the fingers and associated sleeve flanges eliminate fatigue failure of the actuator/sleeve interconnection. Further, the tapered set screws joining the chuck body and collet retaining ring permit accurate radial positioning of the ring relative to the chuck body and once tightened, the tapered set screws firmly secure the ring in place so that the collet is held in a fixed position relative to the chuck body both axially and radially during the collet closing and opening sequences thereby improving workpiece machining repeatability. Moreover, the elimination of the bolts found in prior collet chuck assemblies together with the integral, unitary construction mentioned above substantially reduces the number of parts thereby simplifying the assembly. It will also be seen that the actuator and sleeve are easily separated, requiring only rotation of the actuator relative to the sleeve to disengage the flanges on the sleeve from the grooves in the actuator fingers enabling the actuator to be readily withdrawn from the sleeve.

It should be appreciated that the foregoing description is only illustrative of the invention. Various alternatives and modifications can be devised by those skilled in the art without departing from the spirit of the invention. Accordingly, the present invention is intended to embrace all such alternatives, modifications and variations as fall within the scope of the appended claims.

What is claimed is:

1. A dead length collet chuck assembly for actuating a collet comprising a threaded rear end portion and a compressible, split forward end portion having a flared exterior surface and defining a plurality of jaws for holding a workpiece, the assembly having a longitudinal, central axis and comprising:

a chuck body having a forward end portion having a first bore coaxial of the central axis, a rear end portion having a second bore coaxial of the central axial, said chuck body carrying means for engaging the threaded rear end portion of the collet and for restraining the collet against axial movement relative to the chuck body;

a collet closing sleeve slidably disposed within the first bore of the chuck body and axially displaceable relative to the chuck body, the closing sleeve having forward and rear end portions, an interior surface and an exterior surface, the interior surface of the sleeve at the forward end portion thereof being flared to engage and mate with the flared exterior surface of the forward end portion of the collet, axial displacement of the closing sleeve relative to the chuck body in one direction compressing the jaws of the collet and axial displacement of the closing sleeve in the other direction releasing the jaws; and a collet actuator slidably disposed within the second bore of the chuck body, the actuator being adapted to be coupled to an actuator driver for axially displacing the actuator relative to the chuck body, the actuator including a plurality of forwardly extending fingers having forward ends, the forward ends of the actuator fingers and the rear portion of the closing sleeve being configured to interlock, axial displacement of the actuator causing a substantially corresponding axial displacement of the closing sleeve whereby the jaws of the collet are compressed or released.

2. A collet chuck assembly, as defined in claim 1, in which:

the actuator and the fingers extending forwardly therefrom comprise an integral, unitary actuator structure.

3. A collet chuck assembly, as defined in claim 2, in which:

the collet engaging and restraining means comprises a collet retainer ring carried within the chuck body and fixedly attached thereto, the collet retainer ring having internal threads for receiving the threaded rear end of the collect, the collet retainer ring being disposed adjacent the rear end portion of the closing sleeve and including spaced apart openings through which the actuator fingers extend.

4. A collet chuck assembly, as defined in claim 3, in which:

the fingers have internal surfaces, the internal surface of each finger having a groove adjacent the forward end of the finger; and the external surface of the rear portion of the closing sleeve including a plurality of outwardly projecting flange segments corresponding in number to the number of fingers, each flange segment being received by the groove of a corresponding finger in interlocking fashion.

5. A collet chuck assembly, as defined in claim 4, in which:

the projecting actuator fingers each subtend a first angle; and the spaces between the flanges projecting from the rear portion of the closer sleeve subtend a second angle, and wherein the second angle is greater than the first angle.

6. A collet chuck assembly, as defined in claim 3, in which:

the collet retainer ring is held in place within the chuck body by at least one radially extending threaded fastener carried by the chuck body.

7. A collet chuck assembly, as defined in claim 6, in which:

the collet retainer ring is held in place within the chuck body by a plurality of radially extending fasteners each having a threaded portion received by the chuck body, each fastener further including a tapered portion received by a correspondingly tapered hole in the collet retainer ring, the retainer ring being thereby fixedly secured against both axial and radial movement relative to the chuck body.

8. A collet chuck assembly, as defined in claim 1, in which:

the external surface of the collet closing sleeve has an axially extending slot; and the chuck body carries a radially extending fastener having an inner end projecting into said slot, whereby the closing sleeve is restrained against rotation relative to the chuck body.

\* \* \* \* \*